(12) United States Patent
Atwater et al.

(10) Patent No.: US 6,982,048 B1
(45) Date of Patent: Jan. 3, 2006

(54) POTASSIUM STABILIZED MANGANESE DIOXIDE FOR LITHIUM RECHARGEABLE BATTERIES

(75) Inventors: Terrill B. Atwater, North Plainfield, NJ (US); Alvin J. Salkind, Princeton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 73 days.

(21) Appl. No.: 10/843,635

(22) Filed: May 4, 2004

Related U.S. Application Data

(62) Division of application No. 09/954,294, filed on Sep. 11, 2001, now Pat. No. 6,770,398.

(51) Int. Cl.
H01M 4/50 (2006.01)
H01M 4/58 (2006.01)
C01G 45/12 (2006.01)

(52) U.S. Cl. ............................. 252/518.1; 252/519.1; 429/224; 429/231.1; 429/206; 423/599; 423/641

(58) Field of Classification Search ............ 252/518.1, 252/519.1; 429/224, 231.1, 206; 423/599, 423/641
See application file for complete search history.

(56) References Cited

U.S. PATENT DOCUMENTS 5,478,674 A * 12/1995 Miyasaka ................. 429/231.3
5,561,006 A * 10/1996 Lecerf et al. ............... 429/224
6,306,542 B1 * 10/2001 Nakano et al. ............. 429/224
6,576,215 B1 * 6/2003 Numata et al. ............. 423/599
6,761,997 B2 * 7/2004 Munakata et al. ......... 429/231.1

* cited by examiner

Primary Examiner—Mark Kopec
Assistant Examiner—Kallambella Vijayakumar
(74) Attorney, Agent, or Firm—Michael Zelenka; George B. Tereschuk

(57) ABSTRACT

The present invention provides a potassium-doped mixed metal oxide cathode material formed by advantageously alloying $MnO_2$ with potassium and lithium to provide a new mixed metal oxide cathode material as the positive electrode in rechargeable lithium and lithium ion electrochemical cells. By alloying MnO2 with potassium and lithium in a $Li_xK_yMn_2O_4$ compound, the cathode materials of the present invention afford overcharge protection that allows the cathode to be fully reversible. Manganese dioxide doped with potassium was initially examined as a cathode material for rechargeable lithium and lithium-ion batteries in order to provide a new mixed metal oxide cathode material as the positive electrode in rechargeable lithium and lithium ion electrochemical cells. The $Li_xK_yMn_2O_4$ material is incorporated into an electrochemical cell with either a lithium metal or lithium ion anode and an organic electrolyte. In one embodiment, the cathode of the present invention comprises a compound with the general formula $Li_xK_yMn_2O_4$, where $y<0.5$, $x+y<1.0$ and the reversible region for x is between $0.0<x<1.0-y$ to provide the required overcharge protection and a high voltage cutoff on charge. In the preferred embodiment, a cathode comprising $Li_{0.8}K_{0.1}Mn_2O_4$ is provided. The cathode materials, cathodes, lithium electrochemical device and methods of this invention answer the long-felt need for a reversible cathode for rechargeable lithium batteries without suffering from the shortcomings, limitations and disadvantages of, rigid stoichiometry electronic control and loss of reversibility.

19 Claims, 6 Drawing Sheets

POTASSIUM STABILIZED MANGANESE DIOXIDE FOR LITHIUM RECHARGEABLE BATTERIES

This application is a divisional application of U.S. patent application Ser. No. 09/954,294, entitled, "Potassium Stabilized Manganese Dioxide For Lithium Rechargeable Batteries" which was filed on Sep. 11, 2001 by the inventors herein, and is currently the U.S. Pat. No. 6,770,398. This divisional application is being filed under 35 USC 120, 35 USC 121 and 37 CFR j 1.53 (b), and priority from the Sep. 11, 2001 effective date of the first application Ser. No. (09/954,294) is hereby claimed.

GOVERNMENT INTEREST

The invention described herein may be manufactured, used, imported, sold, and licensed by or for the Government of the United States of America without the payment to me of any royalty thereon.

FIELD OF THE INVENTION

The present invention relates generally to the field of electrochemical power sources, and more particularly to rechargeable lithium and lithium-ion batteries using manganese oxide as the positive electrode.

BACKGROUND OF THE INVENTION

Portable batteries with increased energy and power densities are required as the use of portable electronic equipment rapidly continues to increase. Batteries are typically the limiting factor in the performance of most commercial and military portable electronic equipment due to the restrictions on the size, weight and configuration placed by the equipment on the power source. In some cases, safety and environmental factors are also significant considerations for deploying a particular power source. Lithium batteries provide high energy density, conformal packaging, and improved safety, which make them one of the most promising electrochemical systems under development today.

Lithium batteries use high valence metal oxide materials, which are reduced during the electrochemical reaction. This reaction in rechargeable lithium and rechargeable lithium ion batteries must be fully reversible in order to have a viable cell. Common reversible metal oxide materials used in lithium batteries include: $Li_xMn_2O_4$, $Li_xCoO_2$ and $Li_xNiO_2$. These materials remain reversible whenever "x" is maintained between 0.10 and 0.85 for $Li_xMn_2O_4$ and 0.4 and 0.95 for $Li_xCoO_2$ and $Li_xNiO_2$. However, if the stoichiometry exceeds these limitations, the material undergoes a phase change and is no longer reversible. The primary consequence of the phase change of the material and subsequent irreversibility is the cell will no longer accept a charge rendering the cell inoperable. In order to maintain this stoichiometry rigid electronic control is employed. Thus there has been a long-felt need to solve the problems associated with loss of reversibility in lithium batteries without suffering from the disadvantages, limitations and shortcomings associated with rigid stoichiometry electronic control and loss of reversibility. A mixed metal oxide that introduces potassium into the cathode structure yields a material that provides a high voltage cut off, which prevents over charge and thus retains reversibility.

In order to resolve the reversibility problem, electrochemical measurements were performed on rechargeable lithium batteries using potassium doped manganese dioxide as the positive electrode. These measurements identified two distinct reversible regions for the $Li/Li_xK_yMn_2O_4$ electrochemical couple. Changes in cell behavior as a function of potassium stoichiometry in $MnO_2$, as well as cell discharge and charge properties with respect to the potassium and lithium stoichiometry, were also measured. Preliminary results indicated that $Li/Li_xK_yMn_2O_4$ electrochemical cells would produce the required reversibility and still meet other significant lithium battery operational objectives, without suffering from the setbacks, limitations and disadvantages of rigid stoichiometry electronic control and loss of reversibility associated with other lithium battery configurations.

The present invention provides a potassium-doped mixed metal oxide cathode material comprising alloying $MnO_2$ with potassium and lithium in a $Li_xK_yMn_2O_4$ compound affording overcharge protection that allows the cathode to be fully reversible. The $Li_xK_yMn_2O_{24}$ material is incorporated into an electrochemical cell with either a lithium metal or lithium ion anode and an organic electrolyte. In one embodiment, the cathode of the present invention comprises a compound with the general formula $Li_xK_yMn_2O_4$, where $y<0.5$, $x+y<1.0$ and the reversible region for x is between $0.0<x<1.0-y$ to provide the required overcharge protection and a high voltage cutoff on charge. In the preferred embodiment, a cathode comprising $Li_{0.8}K_{0.1}Mn_2O_{24}$ is provided. The cathodes of this invention answer the long-felt need for a reversible cathode for rechargeable lithium batteries without suffering from the shortcomings, limitations and disadvantages of, rigid stoichiometry electronic control and loss of reversibility. The present invention also includes a single step and two step method for making cathode material for lithium electrochemical devices.

SUMMARY OF THE INVENTION

It is an object of the present invention to provide a potassium-doped mixed metal oxide cathode material for use as the positive electrode in rechargeable lithium and lithium ion electrochemical cells.

Another object of the present invention is to provide a potassium-doped mixed metal oxide cathode material for use as the positive electrode in rechargeable lithium and lithium ion electrochemical cells having the general formula $Li_xK_yMn_2O_{24}$.

It is still another object of the present invention is to provide a potassium-doped mixed metal oxide cathode material for use as the positive electrode in rechargeable lithium and lithium ion electrochemical cells having the general formula $Li_xK_yMn_2O_4$, where $y<0.5$, $x+y<1.0$ and the reversible region for x is between $0.0<x<1.0-y$, so that overcharge protection is attained by exploiting a voltage increase on charge after a stable charge region as x approaches 0.0.

These and other objects and can now be advantageously attained by alloying $MnO_2$ with potassium and lithium for the lithium battery cathode of the present invention. Manganese dioxide doped with potassium was initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated by doping manganese dioxide with potassium. This material was then used as an intermediate for further processing and lithiation for use in rechargeable lithium batteries. The devices and methods of the present invention provided much improved initial specific capacity of about 130 mAhrs/g, a coulombic efficiency greater than 95 percent, the discharge capacity of the system was maintained at two-thirds of the initial discharge through 90 cycles and the material also exhibited an inherent overcharge protection.

DETAILED DESCRIPTION OF THE DRAWINGS

Figure 1:
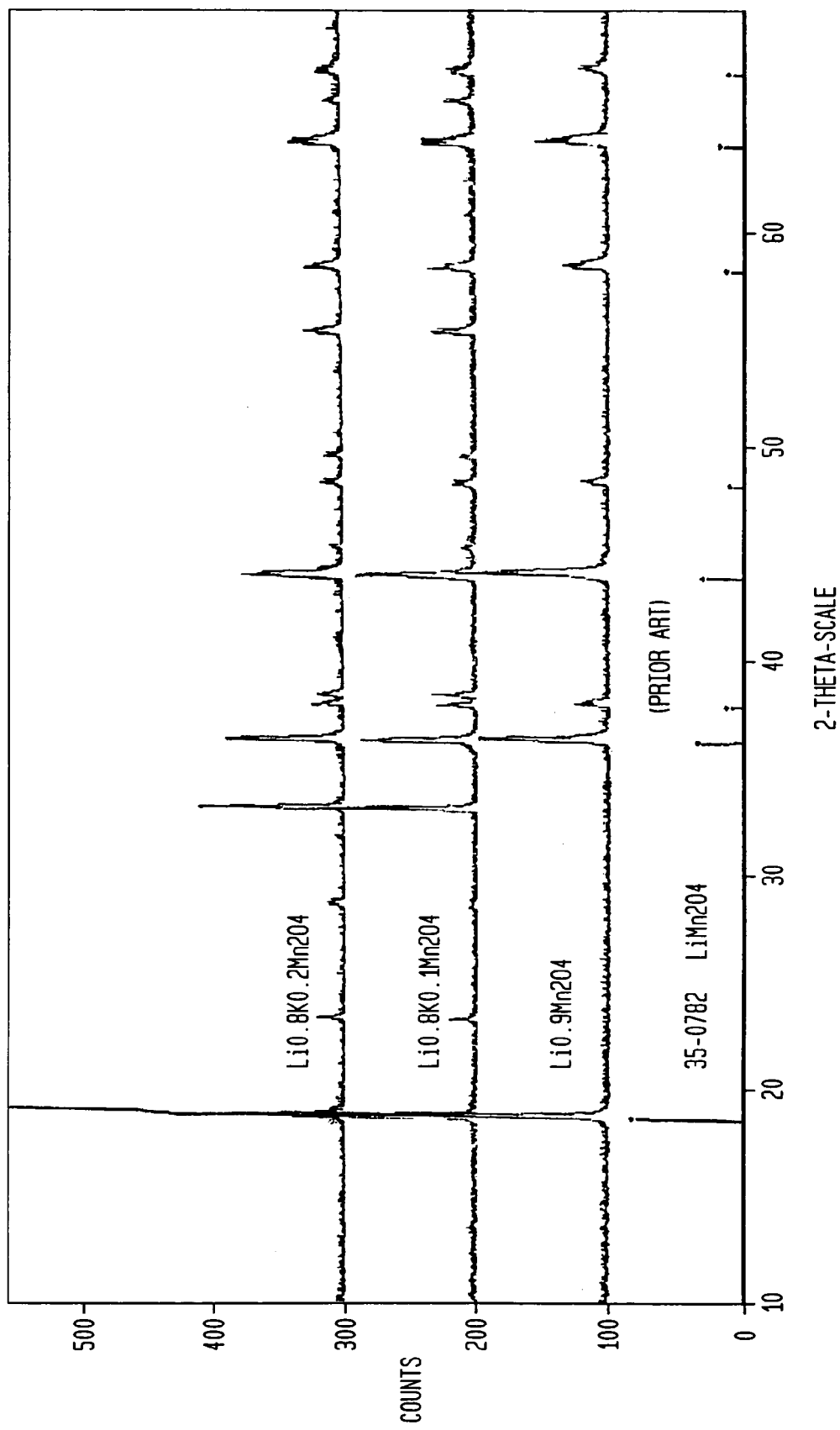
FIG. 1 is a chart comparing a prior art compound's X-ray diffraction patterns with several $Li_xK_yMn_2O_4$ compounds of the present invention.

The potassium-doped mixed metal oxide cathode material of the present invention comprises alloying $MnO_2$ with potassium and lithium in a compound having the general formula $Li_xK_yMn_2O_4$, where y<0.5, x+y<1.0 and the reversible region for x is between 0.0<x<1.0.-y. In accordance with the present invention, this compound provides the necessary overcharge protection to allow the cathode to be fully reversible and thereby overcome the shortcomings, disadvantages and limitations of prior art non-reversible lithium batteries. In accordance with the present invention, the $Li_xK_yMn_2O_4$ material is used as a lithium battery cathode or as an intermediate for further processing and lithiation, and is then mixed with conductive carbon and a binder to fabricate a battery cathode. An electrochemical cell is then fabricated with either a lithium metal or lithium ion anode and an organic electrolyte and this invention's mixed metal oxide cathode. In this embodiment, exploiting a voltage increase on charge after a stable charge region as x approaches 0.0 attains the required overcharge protection. This characteristic can also be used as a high voltage cutoff on charge. The preferred embodiment is a cathode material comprising an $Li_{0.8}K_{0.1}Mn_2O_4$ compound that provides an optimal electrochemical cell performance of increased capacity per gram of active $Li_xK_yMn_2O_4$ material and a lower over potential on charge increasing the cells overall efficiency, without suffering from the rigid stoichiometry electronic control and loss of reversibility of prior art cells.

Active starting material with stoichiometries of $Li_{0.8}K_{0.2}Mn_2O_4$ and $Li_{0.8}K_{0.1}Mn_2O_4$ was used to demonstrate the viability of this material, other stoichiometries of $Li_xK_yMn_2O_4$ can also be used to optimize the cell performance and are considered to be within the contemplation of this invention. Similarly, variations in heat treatment sequences, $Li_xK_yMn_2O_4$ fabrication techniques, other potassium-doped metal oxides for lithium batteries and other factors could also result in optimal cell performance.

Manganese dioxide doped with potassium was initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated by doping manganese dioxide with potassium. This material was then used as an intermediate for further processing and lithiation for use in rechargeable lithium batteries. The lithium-potassium doped manganese dioxide cathode material of the present invention resulted in an initial specific capacity of 130 mAhrs/g. The system provided a coulombic efficiency exceeding 95 percent and maintained a discharge capacity at two thirds of the initial discharge through 90 cycles. Further, the material of the present invention also exhibited an inherent overcharge protection.

Referring now to the drawings, FIG. 1 is a chart comparing a prior art compound's X-ray diffraction patterns with three $Li_{0.8}K_yMn_2O_4$ cathode materials compound of the present invention: $Li_{0.8}K_{0.2}Mn_2O_4$, $Li_{0.8}K_{0.1}Mn_2O_4$, and $Li_{0.9}Mn_2O_4$. The prior art compound is the 35–0782 $LiMn_2O_4$ X-ray diffraction card file. In this chart, the X-ray patterns show a greater number of diffraction angle peaks present in the potassium-doped materials than in the 35–0782 $LiMn_2O_4$. The higher number of diffraction peaks for the three compounds of this invention shown in this chart indicates the influence of potassium in the $LiMn_2O_4$ structure. It should also be noted that while most of the peaks have similar magnitudes including the additional peaks there are notable exceptions. The peak at 28.5°2θ increases with increased potassium content and the peak at 65.5°2θ decreases with increasing potassium content.

Figure 2:
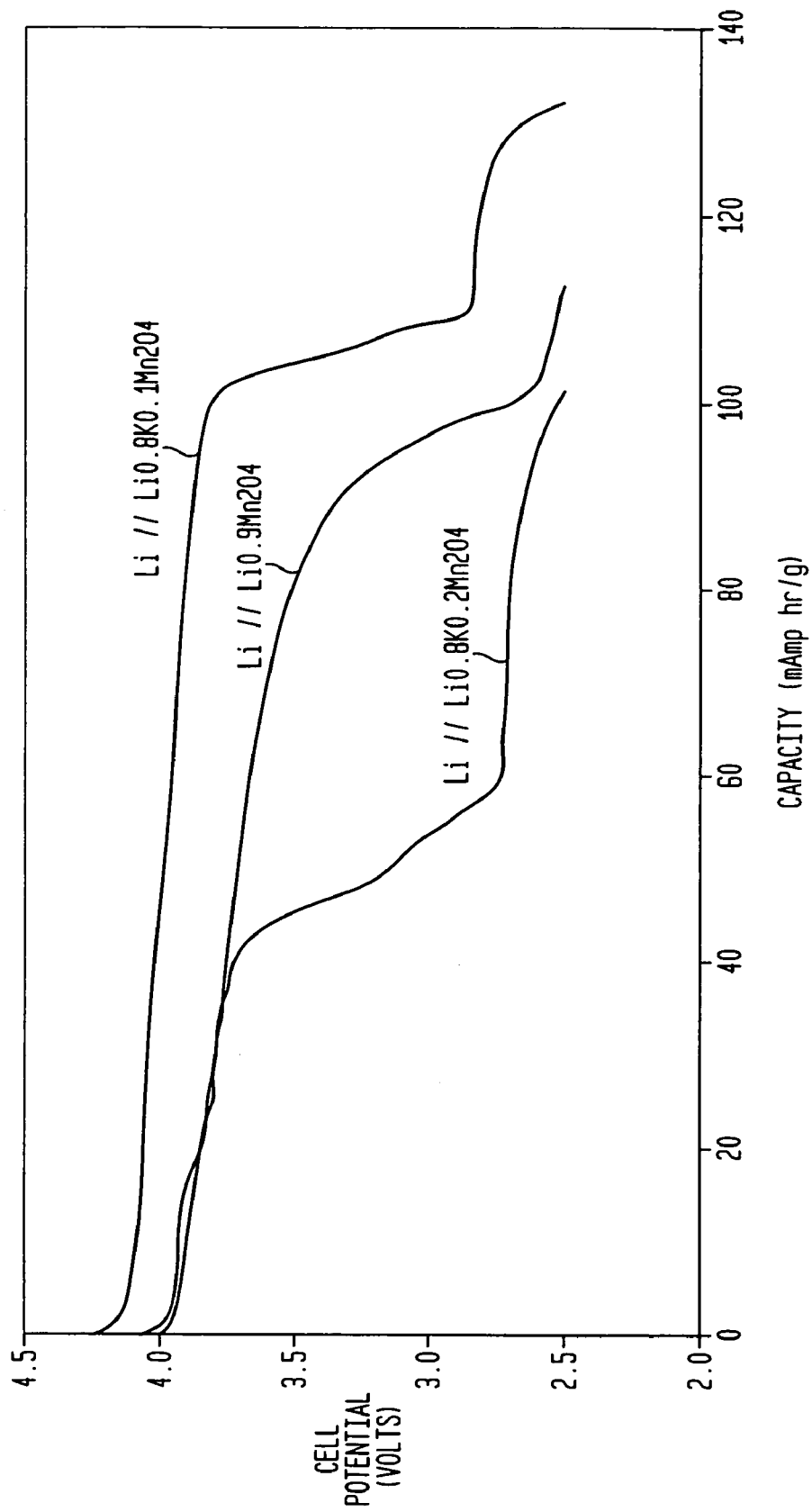
FIG. 2 is a chart comparing 0.5 mA discharge for three cells composed of the $Li_xK_yMn_2O_4$ compound of the present invention.

FIG. 2 is a chart showing comparative discharge curves for cathode material in accordance with the present invention where subscript Y in $Li_xK_yMn_2O_4$ equals 0.0, 0.1 and 0.2. The data in this chart is based on the $10^{th}$ discharge for each cell, which is a typical discharge for each stoichiometry. In this experiment, the cells were charged and discharged at 0.5 mA/cm², which resulted in a 6 to 7 hour discharge. This chart shows the enhanced discharge capability of cells with a $Li_{0.8}K_{0.1}Mn_2O_4$ cathode, and unfavorable results for the $Li_{0.8}K_{0.2}Mn_2O_4$ cathode cells. The data for $Li/Li_{0.8}K_{0.2}Mn_2O_4$ cell shows three plateaus in the discharge curve indicating a phase change with lithium insertion into the cathode.

Figure 3:
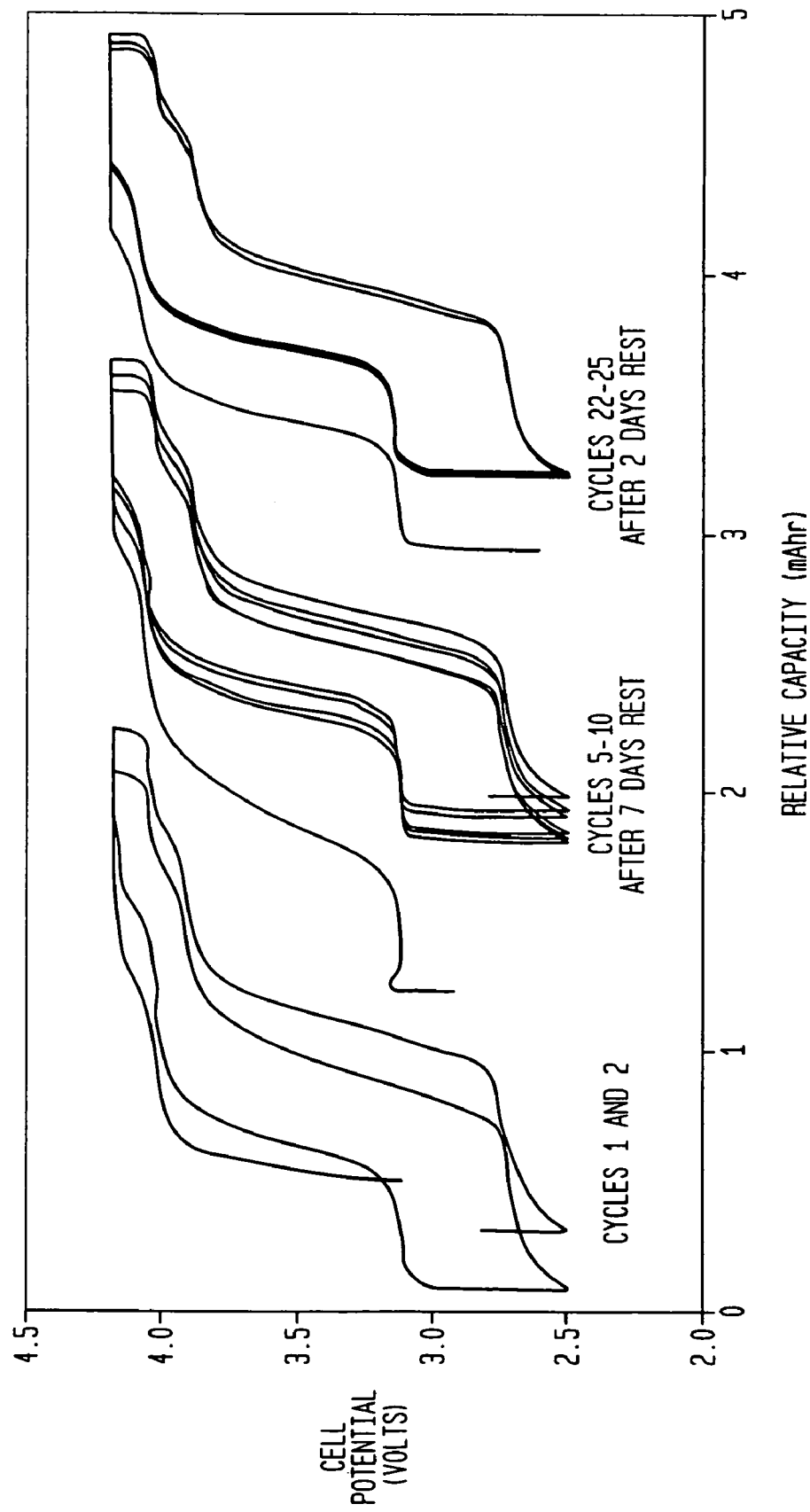
FIG. 3 is a chart comparing 1.0 mA cycles for cells composed of $Li/Li_{0.8}K_{0.2}Mn_2O_4$ compound of the present invention.
Figure 4:
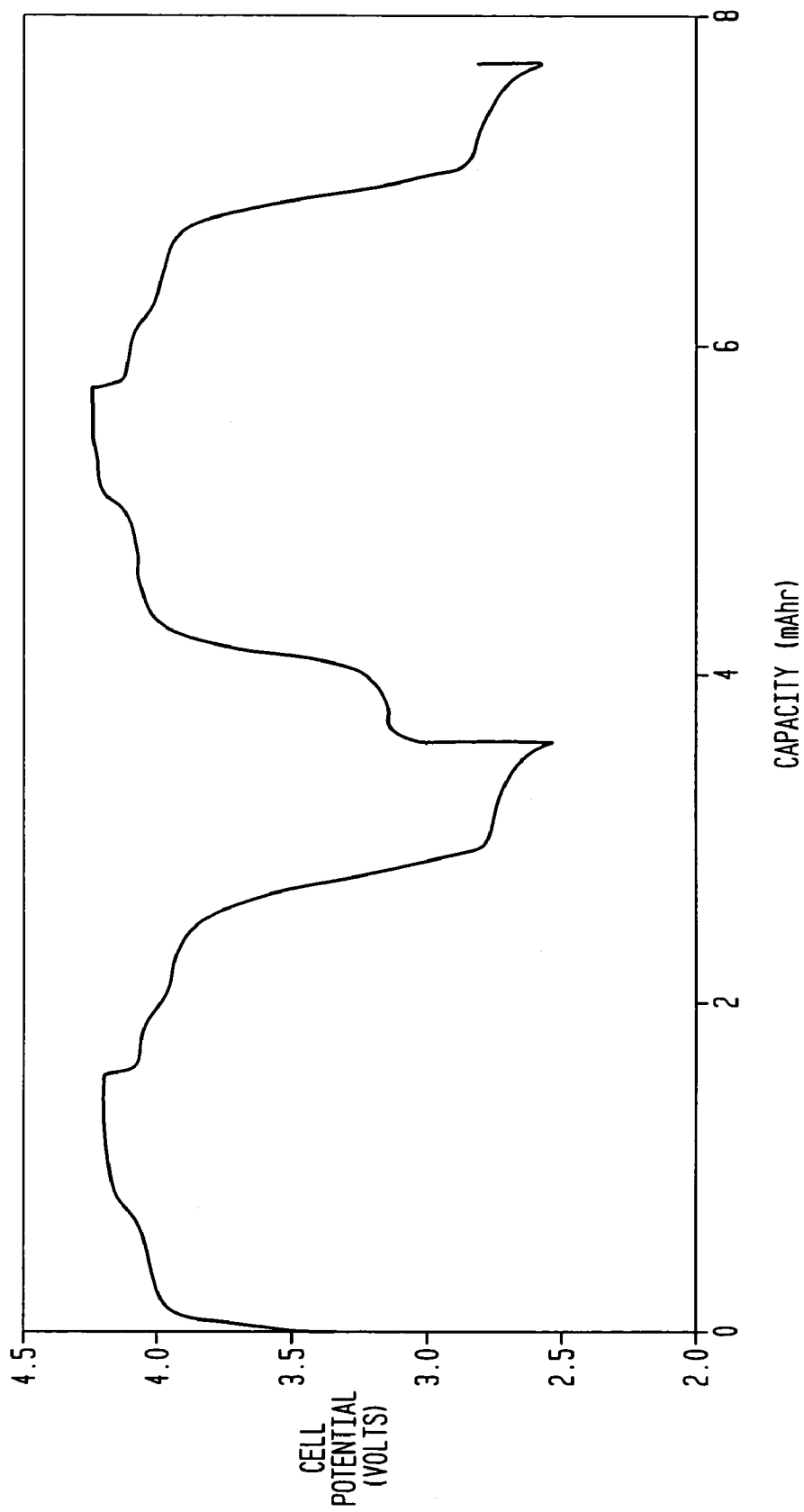
FIG. 4 is a chart depicting the initial cycles for cells composed of $Li/Li_{0.8}K_{0.2}Mn_2O_4$ compound of the present invention.

FIG. 3 is a chart comparing 1.0 mA cycles for cells composed of $Li/Li_{0.8}K_{0.2}Mn_2O_4$ compound of the present invention. FIG. 4 is a chart depicting the initial 1.0 mA/cm² cycles for cells composed of the $Li/Li_{0.8}K_{0.2}Mn_2O_4$ compound of the present invention. This chart depicts the initial and second charge and discharge cycle. Initially the cell accepted a 1.6 mAhrs charge followed by a 2.01 mAhr/g discharge. The second cycle consisted of a 2.2 mAhr charge and delivered 1.95 mAhr/g on discharge.

Figure 5:
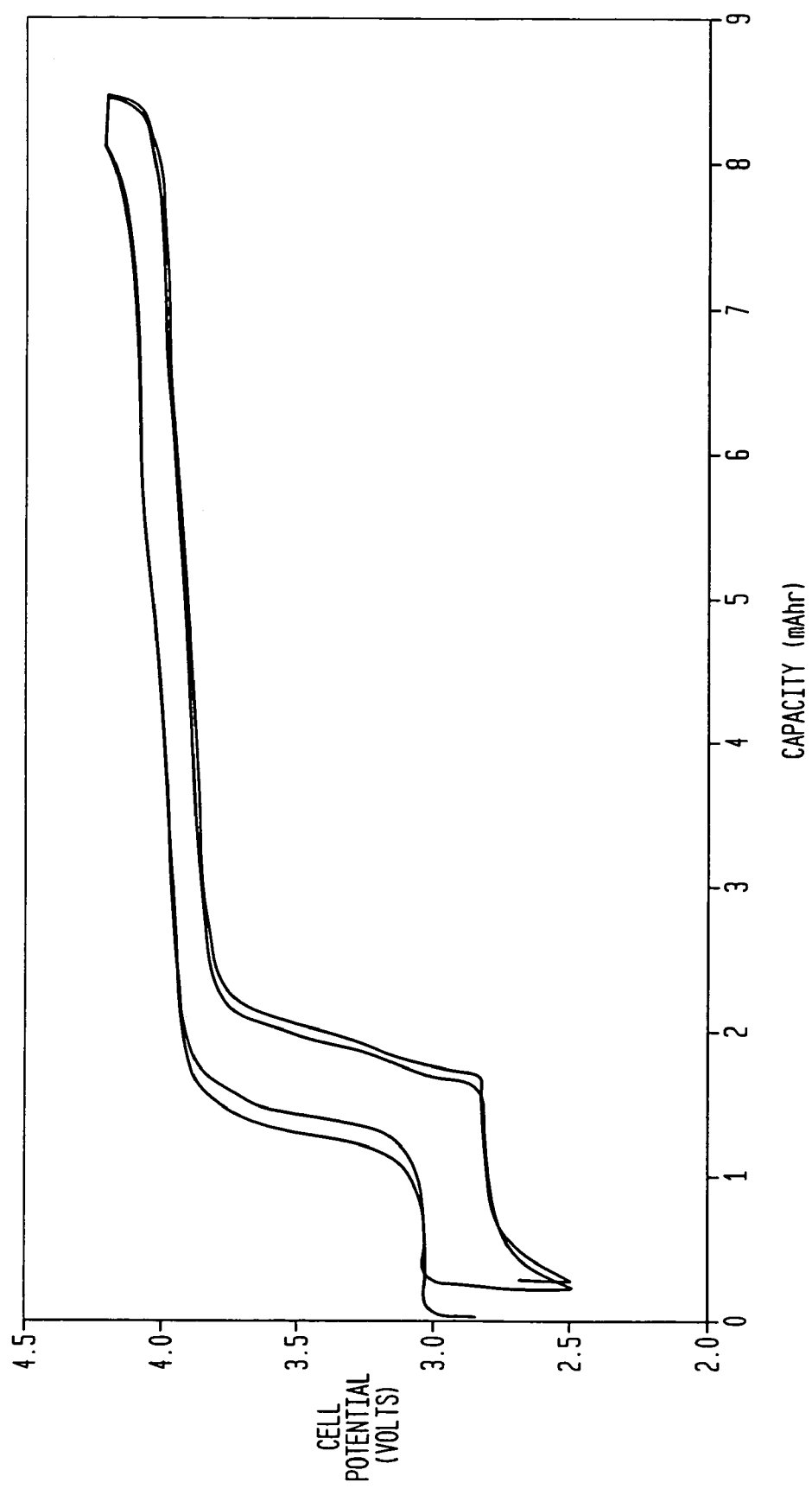
FIG. 5 depicts the $10^{th}$ & $11^{th}$ cycle for a 0.5 mA a cell composed of the $Li/Li_{0.8}K_{0.1}Mn_2O_4$ compound of the present invention.

FIG. 5 depicts the $10^{th}$ and $11^{th}$ cycle for a 0.5 mA cell composed of the $Li/Li_{0.8}K_{0.1}Mn_2O_4$ compound of the present invention. In this experiment, the cell was charged and discharged at 0.5 mA/cm² after 2 days casual storage. This chart shows a coulombic over charge of 0.218 mAhr for the $10^{th}$ charge cycle followed by a 0.058 mAhr over charge for the $11^{th}$ charge. These results correspond to coulombic efficiencies of 97 and 99 percent, respectively. The data also shows the low over-potential required for charge, resulting in a 93 and 95 percent energy efficient charge for the $10^{th\ and}$ $11^{th}$ cycle, respectively.

The data presented in FIGS. 1–5 demonstrate that a stable potassium doped lithium manganese oxide material can be fabricated for use as a rechargeable lithium battery cathode. After an initial specific capacity of 130 mAhr/g for the $Li_{0.8}K_{0.1}Mn_2O_4$ cathode material, a capacity of 115 mAhr/g was maintained for over 25 cycles and about two thirds of the initial discharge capacity was provided through 90 cycles. The potassium doped lithium manganese oxide system of the present invention provides a coulombic efficiency greater than 97 percent and a 95 percent energy efficient charge. These findings indicate that the potassium doped lithium manganese oxide cathode materials of the present invention provide an excellent cathode material for rechargeable lithium and lithium-ion electrochemical cells, with the necessary overcharge protection to allow the cathode to be fully reversible.

The $Li_xK_yMn_2O_4$ cathode material of the present invention was prepared through a series of solid-state reactions. In general terms, $K_yMn_2O_4$ was prepared by mixing KOH and $MnO_2$ and then heating the mixture in an annealing oven for 72 hours. The cathode material was further processed to form $Li_xK_yMn_2O_4$ by mixing LiOH and $K_yMn_2O_4$ and heating that in an annealing oven. After preparation, the materials were characterized with X-ray diffraction and stored in a argon filled dry box. This process shows $MnO_2$ as the starting material in the $Li_xK_yMn_2O_4$ preparation to indicate the final product stoichiometry, but other manganese oxides, such as $Mn_2O_3$ and $Mn_3O_4$, would also yield similar results. X-ray diffraction was used to analyze both the intermediate and final product after the heat treatment step.

The experimental cells were composed of a lithium anode separated from a Teflon bonded cathode with a nonwoven glass separator. The cathode was fabricated by mixing together $Li_xK_yMn_2O_4$, carbon and Teflon in a 80:13:7 or 55:30:15 ratio. The cathode mix was then rolled to 0.04 cm and dried in a vacuum oven. 0.075 cm thick lithium foil was cut using a 1.75 cm diameter (2.48 $cm^2$) hole punch. The cathode was also cut to 2.48 $cm^2$. A 0.01 cm nonwoven glass separator was utilized for the separator and as a wick. The electrolyte used was 1 molar $LiPF_6$ in proportional mixtures of diethyl carbonate, dimethyl carbonate and ethylene carbonate.

Figure 6:
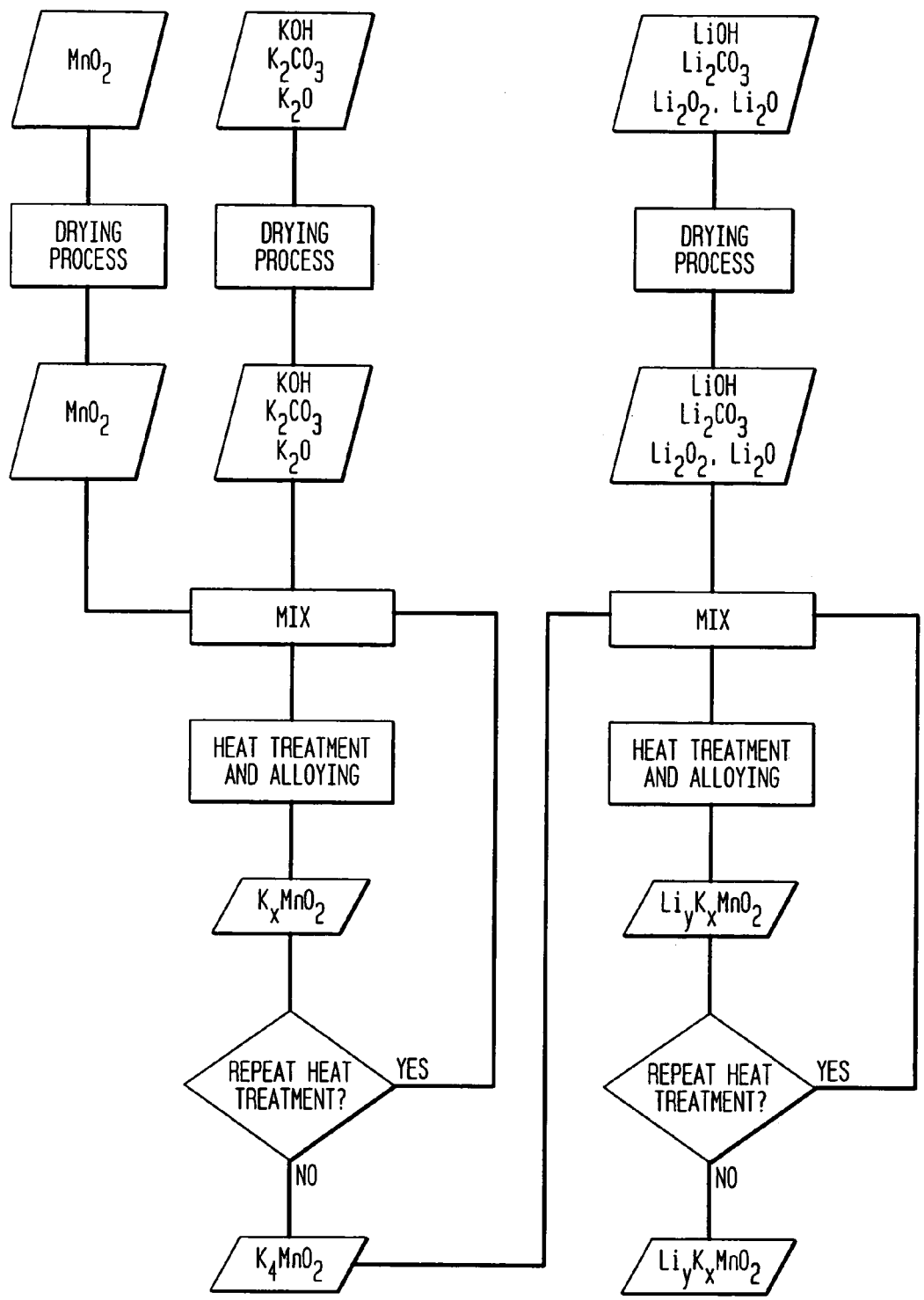
FIG. 6 is a flow diagram depicting the preparation of the $Li_xK_yMn_2O_4$ compounds of the present invention.

FIG. 6 is a flow diagram depicting the preparation of the $Li_xK_yMn_2O_4$ compounds of the present invention. Materials were dried prior to usage. $MnO_2$ (EMD) was dried at 250° C. under vacuum for 24 hours. KOH and LiOH were dried at 100° C. under vacuum for 24 hours. $K_yMnO_2$ was prepared by mixing stoichiometrically KOH and $MnO_2$ and heating in an annealing oven for at least 72 hours at 900° C. After preparation, the materials were stored in an argon glove box. $Li_xK_yMn_2O_4$ was prepared by mixing stoichiometrically LiOH and $K_yMnO_2$ and heating in an annealing oven for at least 72 hours at 900° C. After preparation the materials were stored in an argon glove box.

Evaluation of the $Li_xK_yMn_2O_4$ electrochemical couple was initiated with a basic chronopotentiometry experiment conducted with a liquid electrolyte cell. Both the $Li_xK_yMn_2O_4$ and the $K_yMnO_2$ material were used to fabricate cathodes. Cathodes were fabricated by mixing the active material either $Li_xK_yMn_2O_4$ or $K_yMnO_2$, with carbon and Teflon in an alcohol base. The ratio of materials not including the alcohol was 80:13:7 or 55:30:15 active material:carbon:Teflon. The cathode mix was rolled to 0.04 cm and dried in a vacuum oven. The cell was fabricated using a 1.905 cm diameter Teflon button cell with platinum anode and cathode current collectors 0.0762 cm thick. Lithium foil was cut using a 1.75 cm diameter (2.48 $cm^2$) hole punch. The cathode was also cut to 2.48 $cm^2$. A 0.01 cm nonwoven glass separator was utilized as a wick as well as separator.

Cells composed of the compounds of this invention were prepared by separating a lithium anode from a Teflon bonded cathode with a nonwoven micro porous glass separator (Corning). The electrolyte used was 1 molar $LiPF_6$ in proportional mixtures of diethyl carbonate, dimethyl carbonate and ethylene carbonate.

The Teflon button cells were made from two Teflon plates with 2.48 $cm^2$ cylindrical recesses machined into the plate. The test cells were fabricated in the argon filled glove box (Vacuum Atmospheres) with less than 2 ppm water content during cell preparation and storage of the material after preparation. The bottom of the recess has a small through hole for wire connection to the electrode. An electrode current collector is set into the bottom of the recess. This electrode was made of nickel, stainless steel or platinum. Two half sections of the test fixture are secured together with screws. The cell was placed in a reaction vessel and evacuated. Electrolyte was backfilled into the vessel completely covering both electrodes.

The cells were cycled with an ARBIN Model BT-2043 Battery Test System. A two step charge profile was used. The charge profile consisted of a constant current charged at 2.5 mA (1 $mA/cm^2$) or 1.25 mA (0.5 $mA/cm^2$) to 4.3 volts followed by an applied constant voltage of 4.3 volts. The constant voltage was maintained for 5 hours or until the charge current dropped to 0.1 mA. The cells were discharged at 2.5 or 1.25 mA to 2.5 volts. A rest period of 15 minutes between charge and discharge cycles allowed for the cells to equilibrate.

Referring back to the drawings, the discharge/charge plots for lithium cells fabricated with 80:13:7 $Li_xK_yMnO_2$ cathodes are shown in FIG. 2. This chart shows a 0.5 mA discharge followed by a 0.5 mA charge with 2.0 volt discharge cutoff and a 4.25 volt charge cutoff data for cells fabricated with a $Li_xK_yMnO_2$ cathodes. The cathode for the cell data represented in the FIG. 2 chart was 0.041 cm thick 0.162 gram cathodes (0.130 g active).

The discharge/charge plots for lithium cells fabricated with 55:30:15 $Li_xK_yMnO_2$ cathodes are shown in FIG. 5, which depicts a 0.5 mA discharge followed by a 0.5 mA charge with 2.0 volt discharge cutoff and a 4.25 volt charge cutoff data for cells fabricated with a $Li_xK_yMnO_2$ cathodes. The cathode for the cell data represented in FIG. 5 was 0.041 cm thick 0.070 gram cathodes (0.039 g active).

Those skilled in the art will readily understand that although active starting material with a stoichiometry of $Li_{0.8}K_{0.1}Mn_2O_4$ was used to demonstrate the viability of this material, other stochiometries of $Li_xK_yMn_2O_4$ could be used to optimize the cell performance. Similarly, other sequences of heat treatments, manufacturing techniques and fabrication of $Li_xK_yMn_2O_4$, as well as other potassium-doped metal oxides could be readily used to optimize the cell performance.

A number of variations of the present invention are possible. For example, the devices of the present invention include a cathode material, a cathode and a lithium electrochemical device. Also, the present invention contemplates potassium-manganese mixed metal oxide having the formula $Li_xK_yMnO_2$, and potassium-manganese mixed metal oxide being selected from the group of potassium-manganese mixed metal oxides consisting of $Li_xK_yMnO_2$, $Li_{0.375}K_{0.125}MnO_2$, $Li_{0.8}K_{0.1}Mn_2O_4$ and $Li_{0.8}K_{0.2}Mn_2O_4$. Other variations in columbic efficiency, initial specific capacity, discharge capacity and energy efficiency charge are also possible. Additionally, the cathode material and cathodes can be employed with a battery.

The present invention also encompasses a single step and two step method for making cathode material for lithium electrochemical devices. The single-step method for making a cathode material for a lithium electrochemical system, comprises the steps of drying a manganese oxide and a potassium additive, forming a first mixture by mixing the manganese oxide and potassium additive, forming an intermediate compound by heat-treating the first mixture, forming a potassium-manganese mixed metal oxide, heat-treating the potassium-manganese mixed metal oxide having the general formula $Li_xK_yMnO_2$, where y<0.5 and x+y<1.0, and a reversible region where 0.0<x<1.0−y, preventing a phase change in a cathode, providing an initial specific capacity of about 130 mAhrs/g in the cathode and permitting the cathode to be fully reversible. The two-step method is similar to the one step method except for the added step of mixing an intermediate compound and a lithium compound. Many of the variations to the devices of the present invention also apply to these methods.

Additionally, while several embodiments have been illustrated and described, it will be obvious to those skilled in the art that various modifications may be made without departing from the spirit and scope of this invention.

What we claim is:

1. A method for making a cathode material for a lithium electrochemical system, comprising the steps of:
   drying a manganese oxide and a potassium additive;
   forming a first mixture by mixing said manganese oxide and said potassium additive;
   forming an intermediate compound by heat-treating said first mixture;
   forming a potassium-manganese mixed metal oxide;
   heat-treating said potassium-manganese mixed metal oxide;
   providing said potassium-manganese mixed metal oxide with the general formula $Li_xK_yMnO_2$, where y<0.5 and x+y<1.0, and a reversible region where 0.0<x<1.0−y;

said potassium-manganese mixed metal oxide being $Li_{0.375}K_{0.125}MnO_2$;
   preventing a phase change in a cathode;
   providing an initial specific capacity of about 130 mAhrs/g in said cathode; and
   permitting said cathode to be fully reversible.

2. The method for making said cathode material for the lithium electrochemical system, as recited in claim 1, further comprising the step of forming said potassium-manganese mixed metal oxide by mixing said intermediate compound with a lithium compound.

3. The method for making said cathode material for the lithium electrochemical system, as recited in claim 2, further comprising the step of heat-treating said first mixture for about 72 hours at approximately 900° C.

4. The method for making said cathode material for the lithium electrochemical system, as recited in claim 3, further comprising the step of heat-treating said potassium-manganese mixed metal oxide for about 72 hours at approximately 900° C.

5. The method for making said cathode material for the lithium electrochemical system, as recited in claim 4, further comprising the step of providing a coulombic efficiency of at least 95 percent.

6. The method for making said cathode material for the lithium electrochemical device, as recited in claim 5, wherein said initial specific capacity is 130 mAhrs/g.

7. The method for making said cathode material for the lithium electrochemical device, as recited in claim 6, further comprising the step of providing a discharge capacity at two thirds of said initial discharge through 90 cycles.

8. The method for making said cathode material for the lithium electrochemical device, as recited in claim 7, further comprising the step of providing a 90 percent energy efficiency charge.

9. The method for making said cathode material for the lithium electrochemical system, as recited in claim 8, further comprising the step of forming a cathode from said cathode material.

10. The method for making said cathode material for the lithium electrochemical system, as recited in claim 9, further comprising the step of installing said cathode in a battery.

11. A method for making a cathode material for a lithium electrochemical system, comprising the steps of:
    drying a manganese oxide and a potassium additive;
    forming a first mixture by mixing said manganese oxide and said potassium additive;
    forming an intermediate compound by heat-treating said first mixture;
    mixing said intermediate compound and a lithium compound;
    heat-treating said potassium-manganese mixed metal oxide;
    providing said potassium-manganese mixed metal oxide with the general formula $Li_xK_yMnO_2$, where y<0.5 and x+y<1.0, and a reversible region where 0.0<x<1.0−y;

said potassium-manganese mixed metal oxide being $Li_{0.375}K_{0.125}MnO_2$;
    preventing a phase change in a cathode;
    providing an initial specific capacity of about 130 mAhrs/g in said cathode; and
    permitting said cathode to be fully reversible.

12. The method for making said cathode material for the lithium electrochemical system, as recited in claim 11, further comprising the step of heat-treating said first mixture for about 72 hours at approximately 900° C.

13. The method for making said cathode material for the lithium electrochemical system, as recited in claim 12, further comprising the step of heat-treating said potassium-manganese mixed metal oxide for about 72 hours at approximately 900° C.

14. The method for making said cathode material for the lithium electrochemical system, as recited in claim 13, further comprising the step of providing a coulombic efficiency of at least 95 percent.

15. The method for making said cathode material for the lithium electrochemical device, as recited in claim 14, wherein said initial specific capacity is 130 mAhrs/g.

16. The method for making said cathode material for the lithium electrochemical device, as recited in claim 15, further comprising the step of providing a discharge capacity at two thirds of said initial discharge through 90 cycles.

17. The method for making said cathode material for the lithium electrochemical device, as recited in claim 16, further comprising the step of providing a 90 percent energy efficiency charge.

18. The method for making said cathode material for the lithium electrochemical system, as recited in claim 17, further comprising the step of forming a cathode from said cathode material.

19. The method for making said cathode material for the lithium electrochemical system, as recited in claim 18, further comprising the step of installing said cathode in a battery.

* * * * *